United States Patent [19]

Larsen

[11] Patent Number: 4,710,050

[45] Date of Patent: Dec. 1, 1987

[54] MODULAR METALLIC BELLOWS ASSEMBLY

[75] Inventor: Richard R. Larsen, Port Orange, Fla.

[73] Assignee: Pacific Scientific Co., Anaheim, Calif.

[21] Appl. No.: 921,231

[22] Filed: Oct. 20, 1986

[51] Int. Cl.⁴ .............................................. F16B 7/10
[52] U.S. Cl. ..................................... 403/51; 403/300; 403/362
[58] Field of Search ................... 403/50, 51, 362, 366, 403/367, 288, 372, 300, 336, 338; 285/340, 226

[56] References Cited

U.S. PATENT DOCUMENTS

| | | | |
|---|---|---|---|
| 2,473,618 | 6/1949 | Stillwagon, Jr. | 403/51 |
| 2,607,448 | 8/1952 | Sanborn | 403/51 |
| 2,868,576 | 1/1959 | Boughton | 403/336 |
| 3,669,475 | 6/1972 | Luckenbill | 403/300 |
| 3,678,914 | 7/1972 | Vulliamy | 403/288 |
| 4,109,942 | 8/1978 | Morrill | 285/340 X |
| 4,222,310 | 9/1980 | Garrett et al. | 403/372 |
| 4,475,845 | 10/1984 | Odill et al. | 403/50 |
| 4,601,600 | 7/1986 | Karlsson | 403/338 |

Primary Examiner—Randolph A. Reese
Assistant Examiner—Peter M. Cuomo
Attorney, Agent, or Firm—James A. Hudak

[57] ABSTRACT

A modular approach to the fabrication and assembly of metallic bellows assemblies is disclosed. A metallic bellows module is provided with a female coupling arrangement in the form of a circumferential pocket at one end and a conically shaped male coupling arrangement at the other end thereof. The conically shaped male coupling on one metallic bellows module is receivable within the circumferential pocket in a female coupling on another metallic bellows module. A plurality of set screws positioned around the periphery of the female coupling contact the conical surface of the male coupling causing the male coupling to move axially into the female coupling compressing an O-ring positioned within the circumferential pocket in the female coupling.

12 Claims, 4 Drawing Figures

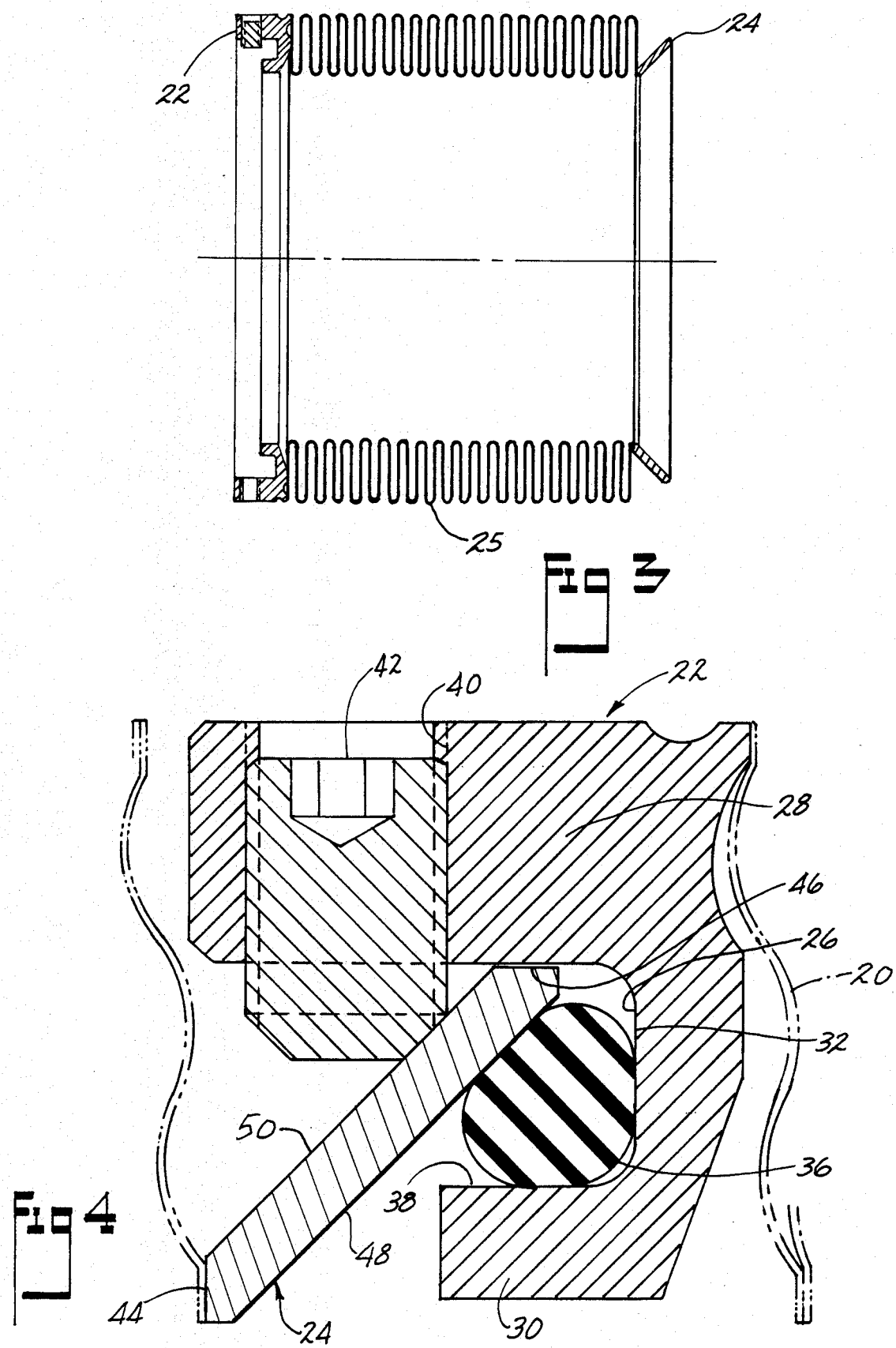

MODULAR METALLIC BELLOWS ASSEMBLY

TECHNICAL FIELD

The present invention relates generally to metallic bellows assemblies, and more particularly to a modular approach for fabricating and assembling such bellows assemblies.

BACKGROUND ART

Metallic bellows are used in many applications and/or devices such as pressure sensors, volume compensators, rod or shaft seals, torque couplings and flexible joints. One type of bellows, the welded metallic bellows, is formed from a plurality of thin metallic ring shaped diaphragms which are welded together. Other types of metallic bellows may be formed by convoluting the wall of a thin-walled metallic tube. In general, the resulting bellows assembly is "customed designed" for a particular application. That is, the specific application determines the dimensions and physical properties of the resulting bellows assembly. Because of the diversity of applications, there is a lack of standardization among bellows assemblies causing such assemblies to be very costly, thus minimizing and/or preventing the use of metallic bellows in many applications in which they might otherwise be readily employed.

Because of the foregoing limitations with respect to the prior art, it has become desirable to develop a modular approach to fabricating and assembling bellows assemblies so as to substantially reduce the cost of the resulting assemblies and make the assemblies readily and easily available for field installation.

SUMMARY OF THE INVENTION

The present invention solves the aforementioned problems associated with the prior art as well as other problems by providng a modular approach to the fabrication and assembly of metallic bellows assemblies. A metallic bellows module is provided, in a limited range of sizes and charcteristics, with a female coupling arrangement at one end and a male coupling arrangement at the other end thereof. The female coupling is in the form of a circumferential pocket which accommodates the male coupling which is in the form of a frustum of a cone. A plurality of set screws are provided around the periphery of the female coupling and contact the conical surface of the male coupling causing the male coupling to move axially into the female coupling compressing an O-ring which is positioned within the female coupling. The end result is the formation of a firm interconnection between the female coupling and the male coupling. A universal plate is provided with a female coupling on one side and a male coupling on the other for use as a simple end cap or as a baffle between two bellows modules. Similarly, various other types of end terminations are provided with female couplings for attachment to a bellows module. A reversing ring, comprised of two male couplings welded in a back-to-back relationship, is also provided permitting the interconnection of two female couplings, when necessary. By using the modular approach, any number of metallic bellows modules can be interconnected and any type of end termination can be provided thereon, thus easily satisfying the requirments of most bellows applications.

BRIEF DESCRIPTION OF THE DRAWINGS

FIG. 3 is a cross-sectional view of a bellows module utilizing hydroformed or mechanically formed bellows.

FIG. 4 is a cross-sectional view of the coupling which is used to interconnect the various sections which comprise the modular bellows assembly of the present invention.

DESCRIPTION OF THE PREFERRED EMBODIMENT

Figure 1:
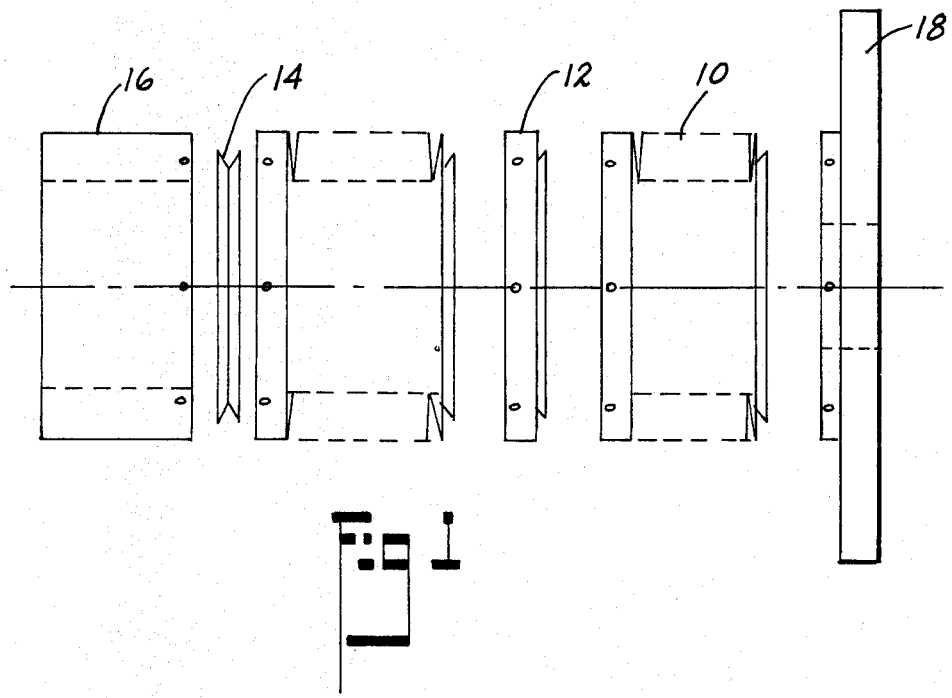
FIG. 1 is a front elevation view of the various sections which comprise the modular bellows assembly of the present invention.

Referring now to the drawings where the illustrations are for the purpose of the describing the preferred embodiment of the present invention and are not intended to limit the invention, FIG. 1 is an assembly drawing of the various modular elements which can be utilized to develop the bellows configuration required in a specific application. As such, the modular elements include a bellows module 10, a universal plate 12, a reversing ring 14, a tube type end 16 and a flange type end 18. Regardless of the modular elements employed, their interconnection will always utilize a similar approach as hereinafter described.

Figure 2:
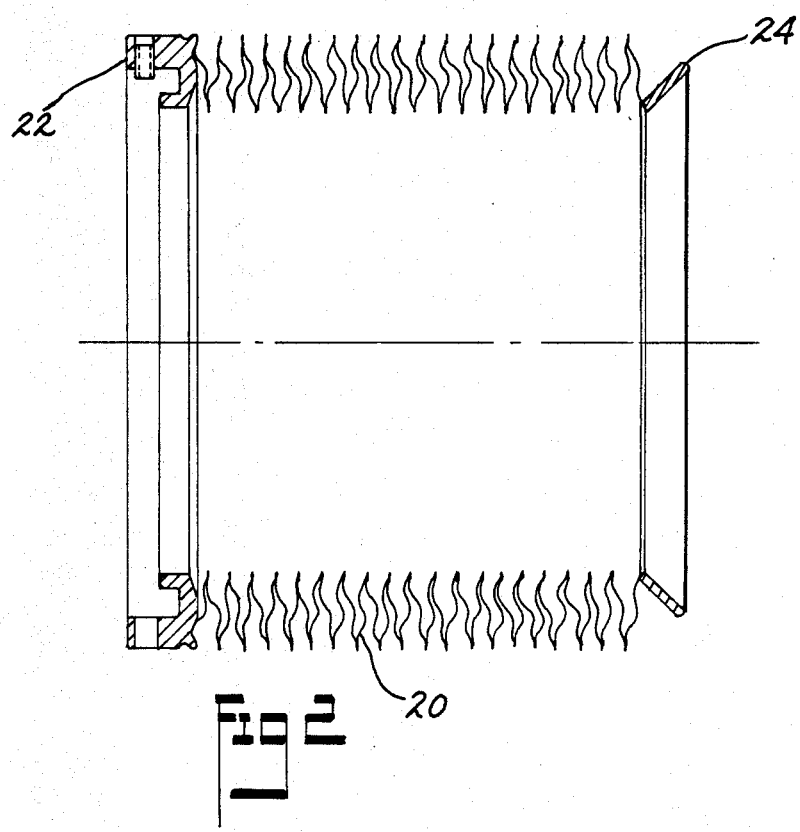
FIG. 2 is a cross-sectional view of a bellows module utilizing a welded bellows comprised of ring-shaped diaphragms in a stacked relationsip.

Each bellows module 10 is usually comprised of a plurality of metallic ring shaped diaphragms 20 in a stacked relationship, as shown in FIG. 2. A female coupling 22 is attached to one end of the plurality of diaphragms 20 and a male coupling 24 is attached to the other end of the plurality of diaphragms 20. Each of the diaphragms 20 is formed from a weldable alloy, such as stainless steel, nickel base steel, high permeability steel, titanium alloys or the like and the diaphragms are welded together along the surfaces defining their inner and outer diameters. The diaphragms typically have a thickness between 0.002–0.010 inches and come in various inner and outer diameters. Each module 10 is comprised of diaphragms having the same inner diameters and outer diameters. The surface defining the outer diameter of the diaphragm located on one end of the stacked plurality of diaphragms is welded to the outer surface of the female coupling 22, whereas the surface adjacent the inner diameter of the diaphragm at the other end of the plurality of stacked diaphragms is welded to the smaller diameter of the male coupling 24, as hereinafter described.

Even though the foregoing refers to a plurality of ring shaped diaphragms 20 in a stacked relationship, these diaphragms 20 may be replaced by a convoluted bellows section 25 of the hydroformed or mechanically formed type, as shown in FIG. 3. Such a bellows section 25 can be formed from thin-walled metallic tubing having physical properties and characteristics similar to that of the plurality of diaphragms 20. The bellows section 25 is attached to the female coupling 22 and the male coupling 24 in a manner similar to that of the plurality of stacked diaphragms 20, i.e., one end of the bellows section 25 is welded to the outer surface of the female couling 22 and the other end of the bellows section 25 is welded to the smaller diameter of the male coupling 24.

The female coupling 22, as shown in FIG. 4, is typically a metallic investment casting or machined part in the form of an annular ring having an outer diameter which approximates the outer diameter of the plurality of stacked diaphragms 20 to which its outer surface is welded. Similarly, the inner diameter of this annularly shaped female coupling 22 is approximately the same size as the inner diameter of the plurality of stacked diaphragms 20 to which it is welded. A circumferential pocket 26 is formed within the female coupling 22 and is concentric with the center of the coupling. The circumferential pocket 26 is defined by circumferential flanges 28 and 30 interconnected by a bottom surface 32 of the coupling 22. The axial length of circumferential flange 30 is less than that of circumferential flange 28, and the diameter of the inner surface 34 of circumferential flange 28 is approximately the same as the outer diameter of the male coupling 24 to permit concentric interconnection of the modular elements, as hereinafter described. An O-ring 36 is received within the circumferential pocket 26 and contacts the bottom surface 32 and the inner surface 38 of the circumferential flange 30. A plurality of radially positioned apertures 40 are provided adjacent the outer edge of the circumferential flange 28. The apertures 40 are approximately evenly spaced around the periphery of the female coupling 22 and are tapped so that a set screw 42 can be received in each of the apertures 40.

The male coupling 24 is in the form of a frustum of a cone and is fabricated from metallic material having physical properties and characeristics similar to that which comprise the plurality of stacked diaphragms 20. The transverse surface 44 adjacent the inner diameter of the coupling 24 is welded to the surface defining the inner diameter of the diaphragm at the other end of the plurality of stacked diaphragms 20. Because of its conical shape, the male coupling 24 flares outwardly at an acute angle with respect to the axis of the bellows module 10. The end of the male coupling 24 is provided with a flat cylindrical surface 46 having a diameter that is slightly less than the diameter of the inner surface 34 of the circumferential flange 28 in the female coupling 22 and is substantially concentric to the inner surface 34 of the circumferential flange 28 when in an interconnected relationship.

In order to interconnect two bellows modules, the male coupling 24 attached to the end of one bellows module is received in the circumferential pocket 26 provided in the female coupling 22 attached to the end of another bellows module. The inner surface 34 of the circumferential flange 28 on the female coupling 22 acts a guide surface for the flat cylindrical surface 46 provided on the male coupling 24. After insertion, the inner conical surface 48 of the male coupling 24 contacts the outer surface of the O-ring 36 provided in the circumferential pocket 26 in the female coupling 22. The set screws 42 are then threadably advanced into the female coupling 22. Such advancement causes the bevelled surface on the tip of each set screw to engage and traverse the outer conical surface 50 of the male coupling 24. Further advancement of the set screws 42 causes the male coupling 24 to move axially deeper into the circumferential pocket 26 so as to firmly compress the O-ring 36. In this manner, a firm mechanical and leak-free interconnection is made between the female coupling 22 and the male coupling 24, and this interconnection is not affected by changes in external pressure to the overall assembly or internal pressure within the interconnected modular bellows assembly sections. This interconnection also resists torsional loads, compressive loads, and extensional loads applied across the coupling from one bellows to an adjacent bellows module, or between a bellows module and an end termination. In addition, this interconnnection permits the transmission of torque and axial forces between the female coupling 22 and the male coupling 24.

The universal plate 12 is a solid plate with a female coupling 22 on one side and a male coupling 24 on the other side thereof. As such, it can be used as a simple end cap by attachment to a bellows module 10 in the same manner that one module attaches to another, or it can be used as a baffle between two modules, joining the male side of one module to the female side of another module. The center portion of the universal plate 12 can be bored out for use as a bellows centering guide in linear actuator applications. Similarly, pressure fittings may be threaded, brazed or welded to the center of the plate 12 for pressure applications.

The tube type end 16 and flange type end 18 are provided with female couplings 22 on one end thereof. The remainder of these ends can be finished machined to the users' specifications. Any bellows module 10 interconnected to these ends can be readily detached from same and stored safely away during the machining operation to keep it free from contamination. The reversing ring 14 is fabricated from two oppositely disposed male couplings 22 welded together along the surfaces defining their inner diameters. This reversing ring 14 serves to attach the tube type end 16 or the flange type end 18 to the female coupling 22 on the end of a bellows module 10 and allows the tube type end 16 and flange type end 18 to be provided in only female end configurations rather than both female and male end configurations, thus eliminating the need to inventory two additional end type configurations.

By providing a common bellows module 10 having a female coupling 22 on one end and a male coupling 24 on the other end thereof, and by providing a universal mounting plate 12, various end termination 16 and 18, and a reversing ring 14, any number of welded bellows modules can be interconnected and various types of terminations or mounting plates can be provided thereon. Thus, the foregoing modular components can be assembled in the field in a multiplicity of ways and/or combinations to satisy most bellows applications. In addition, the modular components can be repeatedly assembled and reassembled, and the components are reusable in other bellows applications. By taking this "building block" modular approach, the modules can be standardized, resulting in lower overall cost, thus permitting a more extensive use of bellows in various mechanical and fluid pressure applications. Thus, the foregoing modular approach greatly increases the number of applications in which metallic bellows can be utilized.

Certain modifications and improvements will occur to those skilled in the art upon reading the foregoing. It should be understood that all such modifications and improvements have been deleted herein for the sake of conciseness and readability but are properly within the scope of the following claims.

I claim:

1. A coupling for connecting a first member to a second member comprising:

a female coupling portion operatively attached to the first member, said female coupling portion containing an annular recess therein;

resilient sealing means received within said annular recess in said female coupling portion;

a male coupling portion operatively attached to the second member, said male coupling portion having a conical configuration and being receivable within said annular recess in said female coupling portion and being positioned therein so as to contact said resilient sealing means; and means for applying a radially inwardly directed force to said male coupling portion causing said male coupling portion to move axially into said female coupling portion compressing said resilient sealing means between said male coupling portion and said female coupling portion.

2. The coupling as defined in claim 1 wherein said male coupling portion and said female coupling portion are substantially concentrically aligned.

3. The coupling as defined in claim 2 wherein said substantial concentric alignment between said male coupling portion and said female coupling portion is obtained through contact between said male coupling portion and said female coupling portion.

4. The coupling as defined in claim 2 wherein said substantial concentric alignment between said male coupling portion and said female coupling portion is obtained through contact between and edge on said male coupling portion and the surface defining said annular recess in said female coupling portion.

5. The coupling as defined in claim 1 wherein actuation of said radially inwardly directed force applying means causes radially inwardly directed force applying means to traverse a surface on said male coupling portion resulting in said male coupling portion moving axially within said female coupling portion compressing said resilient sealing means to provide a firm seal between said male coupling portion and said female coupling portion.

6. The coupling as defined in claim 5 wherein said radially inwardly directed force applying means comprises at least one set screws received within said female coupling portion and positioned so as to be radially inwardly advanceable to contact said surface on said male coupling portion.

7. A coupling for interconnecting modular bellows sections comprising:

a first modular bellows section having a female coupling portion at one end thereof and a male coupling portion at the other end thereof, said female coupling portion containing an annular recess therein;

resilient sealing means received within said annular recess in said female coupling portion in said first modular bellows section;

a second modular bellows section having a female coupling portion at one end thereof and a male coupling portion at the other end thereof, said male coupling portion having a conical configuration and being received within said annular recess in said female coupling portion in said first modular bellows section and being positioned so as to contact said resilient sealing means contained therein; and means for applying a radially inwardly directed force to said male coupling portion on said second modular bellows section causing said male coupling portion on said second modular bellows section to move axially into said female coupling portion of said first modular bellows section compressing said resilient sealing means between said male coupling portion on said second modular bellows section and said female coupling portion on said first modular bellows section.

8. The coupling as defined in claim 7 wherein said male coupling portion on said second modular bellows section and said female coupling portion on said first modular bellows section are substantially concentrically aligned after said first and second modular bellows sections are interconnected.

9. The coupling as defined in claim 8 wherein said concentric alignment between said male coupling portion on said second modular bellows section and said female coupling portion on said first modular bellows section is obtained through contact between said male coupling portion on said second modular bellows section and said female coupling portion on said first modular bellows section.

10. The coupling as defined in claim 8 wherein said substantial concentric alignment between said male coupling portion on said second modular bellows section and said female coupling portion of said first modular bellows section is obtained through contact between an edge on said male coupling portion on said second modular bellows section and the surface defining said annular recess in said female coupling portion in said first modular bellows section.

11. The coupling as defined in claim 7 wherein actuation of said radially inwardly directed force applying means causes said radially inwardly directed force applying means to traverse a surface on said male coupling portion on said second modular bellows section resulting in said male coupling portion on said second modular bellows section moving axially within said female coupling portion on said first modular bellows section compressing said resilient sealing means providing a firm seal between said male coupling portion on said second modular bellows section and said female coupling portion on said first modular bellows section.

12. The coupling as defined in claim 11 wherein said radially inwardly directed force applying means comprises at least one set screws received within said female coupling portion on said first modular bellows section and positioned so as to be radially inwardly advanceable to contact said surface on said male coupling portion on said second modular bellows section.

* * * * *